(12) United States Patent
De Zwart et al.

(10) Patent No.: US 7,697,208 B2
(45) Date of Patent: Apr. 13, 2010

(54) 3D DISPLAY WITH AN IMPROVED PIXEL STRUCTURE (PIXELSPLITTING)

(75) Inventors: Siebe Tjerk De Zwart, Eindhoven (NL); Willem Lubertus Ijzerman, Eindhoven (NL); Tim Dekker, Eindhoven (NL); Ramon Pascal Van Gorkom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 55 days.

(21) Appl. No.: 12/089,212

(22) PCT Filed: Sep. 28, 2006

(86) PCT No.: PCT/IB2006/053537
§ 371 (c)(1),
(2), (4) Date: Apr. 4, 2008

(87) PCT Pub. No.: WO2007/039855
PCT Pub. Date: Apr. 12, 2007

(65) Prior Publication Data
US 2008/0231951 A1 Sep. 25, 2008

(30) Foreign Application Priority Data
Oct. 4, 2005 (EP) .................... 05109200

(51) Int. Cl.
*G02B 27/10* (2006.01)
*G02B 27/22* (2006.01)
(52) U.S. Cl. ..................... 359/626; 359/462
(58) Field of Classification Search ............... 359/462, 359/463, 464, 619, 621, 622, 626; 348/51, 348/52, 59
See application file for complete search history.

(56) References Cited

U.S. PATENT DOCUMENTS

| 5,621,487 A | 4/1997 | Shirochi |
| 2003/0067460 A1 | 4/2003 | Tomono |
| 2005/0057807 A1 | 3/2005 | Takagi et al. |

FOREIGN PATENT DOCUMENTS

| EP | 1185113 A2 | 3/2002 |
| JP | 09189883 A | 7/1997 |
| WO | WO9641227 A1 | 12/1996 |

*Primary Examiner*—David N Spector
(74) *Attorney, Agent, or Firm*—Larry Liberchuk

(57) ABSTRACT

A display apparatus comprising a display device (104, 200, 301, 401) configured to display an image is disclosed. The display device comprises a plurality of picture elements, and one or more lenticular means (203). The lenticular means comprises one or more refracting layers (303, 403) configured to direct light emanating from said picture elements in a plurality of directions such that said image of a picture element is divided in two or more essentially identical images.

12 Claims, 7 Drawing Sheets

3D DISPLAY WITH AN IMPROVED PIXEL STRUCTURE (PIXELSPLITTING)

The present invention relates to a display apparatus comprising a display device configured to display an image. In particular, the present invention relates to a display device comprising a plurality of picture elements, and one or more lenticular means, where the lenticular means comprises one or more refracting layers configured to direct light emanating from said picture elements in a plurality of directions such that said image of a picture element is divided in two or more essentially identical images.

Three dimensional imaging is a well-known technique today. However, traditionally it has been in the form of stereoscopic images where the user has had to have optical manipulating devices of a kind, especially glasses providing separated light transmission in order to obtain the three dimensional effect.

A more recent development is the ability to construct displays with inherent three dimensional (3D) capabilities with no need for extra equipment for the user to carry. Such a technology is autostereoscopy.

One example of autostereoscopy is based on directing light emanating from a two dimensional display array of pixels in different directions. The different directions of the light results in a slight angular disparity, which, by the slightly separated eyes of a human, makes the image being perceived as having three dimensions. One such technique is the use of lenses, or lenticular, in front of a display device. In a lenticular device the light emanating from a subpixel is concentrated in certain directions by means of lenses.

However, the gaps between the individual pixels in the LCD are magnified up by the lenticular creating gaps in the viewing zones. This is avoided by placing the lenticular screen over the LCD at a slight angle. The gaps are smoothened out, resulting in a smooth transition between views.

The lenticular thereby samples the LCD pixels as a function of the view angle. This technique is known as multi-view lenticular based three dimensional displaying.

For instance, in the case of a 7-view system with a standard LCD pixel height to width aspect ratio of 3-to-1, the lenticular is aligned at an angle of a $\tan(\frac{1}{6})=9.46$ to the LCD column direction.

An important issue in multi-view lenticular based three-dimensional displays is the fact that the resolution decreases inversely proportional to the number of views. By using slanted lenticular elements, the resolution penalty can be balanced in the sense that it can be more or less equally distributed over the horizontal and vertical direction. Typically, for a balanced configuration, the effective resolution penalty is approximately equal to the square root of the number of views.

For instance, with a 3D pixel structure of a frequently used 9 views, slant $\frac{1}{6}$ configuration, the horizontal and vertical resolution have decreased by a factor of three with respect to the native resolution of the display. This results in a somewhat grainy image if the display is viewed from a sufficiently close distance.

In efforts to cope with the resolution penalty a number of imaging devices have been developed. One such imaging device representing the state of the art in using slanted lenticular elements, is disclosed in U.S. Patent Application US-2003/0067460 A1. It describes a three-dimensional multi-viewpoint imaging display apparatus including an image forming display flat panel and a lens unit disposed in front of the image forming display flat panel. The lens unit converts images projected from the image forming display flat panel into three-dimensional images. The lens unit includes a set of diffractive optical devices, each of which comprises a plurality of diffractive grating elements that are parallel to one another and are disposed above the image forming display flat panel. The image forming display flat panel may for instance comprise a cathode-ray tube (CRT), a liquid crystal display (LCD), a plasma display panel (PDP), or an electroluminiscent (EL) display.

However, the U.S. Patent Application US-2003/0067460 A1 and other prior art solutions are accompanied with a number of drawbacks, such as the requirement of a large number of complex, miniature elements. Furthermore, no guidance as to reduce pixel structure visibility is given in the U.S. Patent Application US-2003/0067460 A1.

Hence, it is the objective of the invention to provide means to reduce the graininess, thereby giving the illusion or perception of an improved resolution. It is especially an objective with the present invention to provide such a solution and at the same time in a simple and efficient way.

According to the present invention there is provided a display apparatus comprising a display device configured to display an image. The display device comprises a plurality of picture elements and one or more lenticular means. The lenticular means comprises one or more refracting layers configured to direct light, emanating from the picture elements, in a plurality of directions such that the image of a picture element is divided in two or more essentially identical images. Preferably, the centres of the images are being separated at least a distance of 0.5 lens pitch apart Advantageously, the distance of separation may be at least 1.0 lens pitch apart. Even more advantageously, the distance of separation may be at least 1.5 lens pitch apart. Preferably, a first of the one or more of the refracting layers comprises lenticular elements.

Hence, by splitting pixels, the size of the smallest picture elements constituting an image is reduced. Thereby, graininess is reduced resulting in an illusion or perception of increased resolution of the displayed image.

According to a first embodiment of the invention, each of the lenticular elements comprises a discontinuity in the curvature essentially at the centre.

Hereby, it is achieved a more efficient way of manufacturing the lenticular elements since the lenticular can be produced in one single replication step.

According to a second embodiment, a second of the one or more of the refracting layers comprises prism elements.

Multiple layers of lenses and/or prisms gives a plurality of optical surfaces where each surface can be fabricated more accurately.

According to a third embodiment of the invention, the lenticular elements are essentially spherically cylindrical. Hereby, it is obtained an easier process of manufacture of the lenticular elements.

According to a fourth embodiment of the invention, the picture elements of the display apparatus are arranged in a first matrix having a first orientation. The lenticular and/or prism elements have a second orientation and the first and second orientation have an angle of rotation in relation to each other. Having the lenticular and/or prism elements at an angle in relation to the picture elements render the picture elements to appear more equally distributed over the horizontal and vertical directions.

According to a fifth embodiment of the invention, the display apparatus is configured to display 8 simultaneous views and wherein said lenticular and/or prism elements have a slant $\frac{1}{6}$ orientation.

As an advantage using this configuration, the divided images, or satellite images, become more evenly distributed, resulting in a finer pixel structure.

According to an sixth embodiment of the invention, the display apparatus is configured to display 4 views and wherein said lenticular and/or prism elements have a slant ⅓ orientation. Hereby, a resolution penalty lower than in the eight view configuration is achieved.

According to a seventh embodiment of the invention, the lenticular elements are switchable and/or comprise LC material. Hereby, a full native display resolution can be achieved for two dimensional imaging.

Embodiments of the present invention will now be described, by way of examples only, with reference to the accompanying drawings, in which.

Figure 5A:
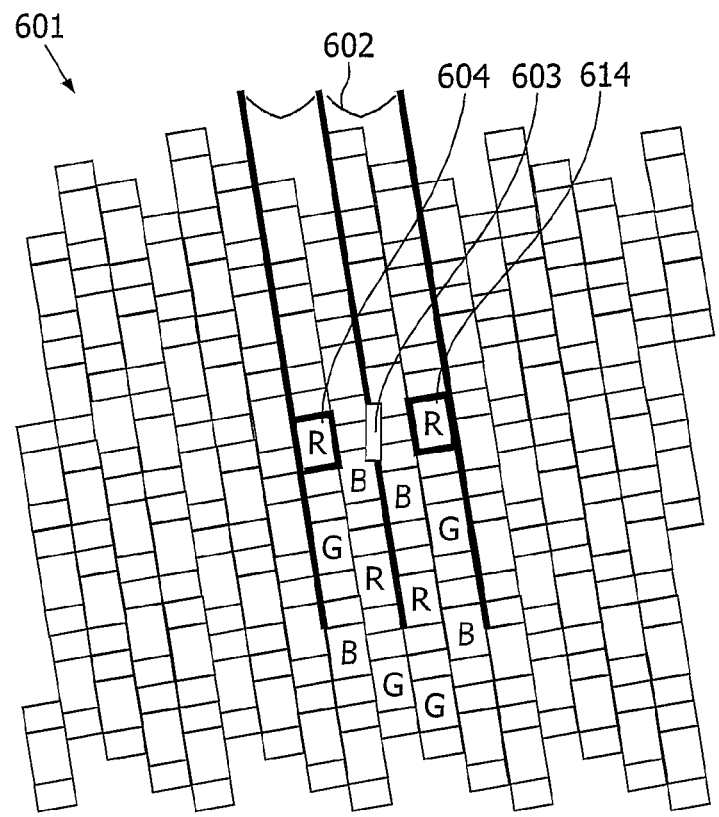
Figure 5B:
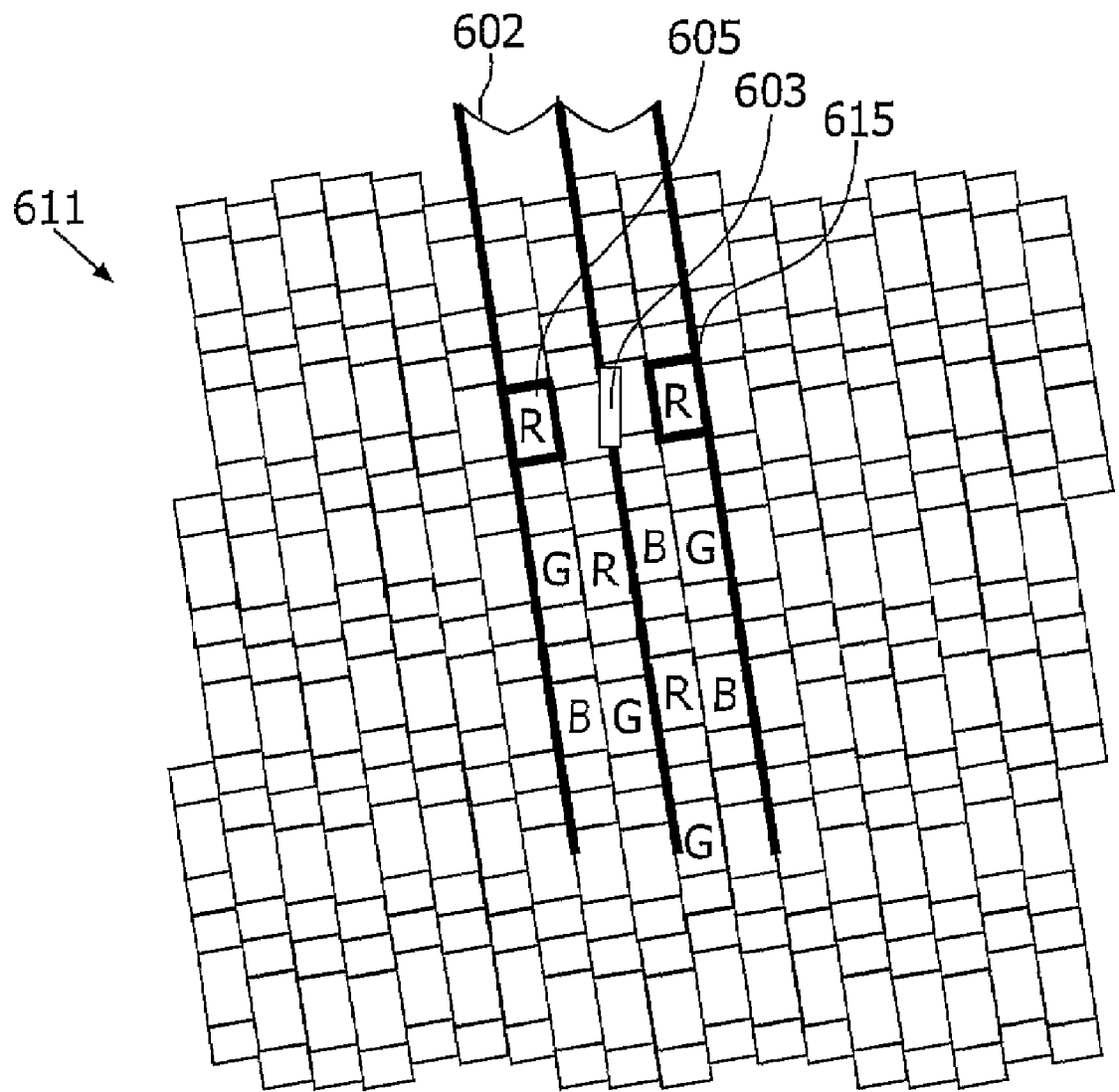

FIG. 4 shows schematically cross-sectional close-up views in which it is illustrated in section a) a conventional layered structure and sections b) to e) a layered structure according to a number of embodiments according to the invention; and FIG. 5 shows schematically a close-up of the pixel splitting structure according to section a) a standard display configuration and section b) a display adapted according to the invention.

Figure 1:
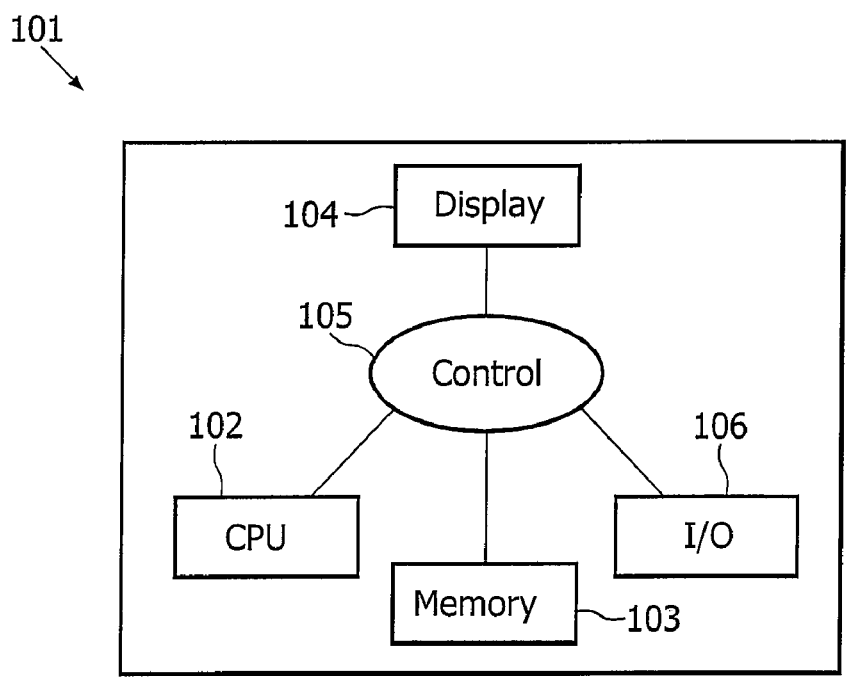
FIG. 1 shows schematically a block diagram of an autostereoscopic display apparatus according to the present invention.

FIG. 1 illustrates schematically an autostereoscopic display apparatus 101 in which the present invention is implemented. The apparatus 101 is capable of processing signals for the production of images. The apparatus 101 comprises a processor 102, memory 103, a display device 104, a control unit 105 as well as an input/output unit 106 for receiving information signals from an external unit (not shown) such as a computer. The general features regarding how these units communicate and operate are known to the person skilled in the art and is therefore not discussed further.

Figure 2:
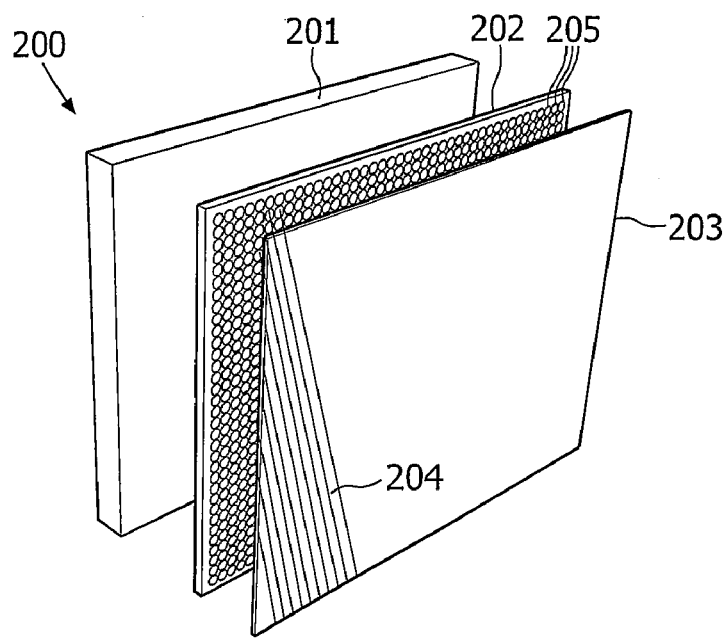
FIG. 2 shows schematically a perspective view of one embodiment of the layers of a display device according to the invention.

FIG. 2 is a schematic view of a display device 200 according to the invention. The display device 200 may be similar to the display device 104 in the apparatus 101 in FIG. 1. The display device 104 comprises a light source 201, a matrix LC display 202 and lenticular means 203. The lenticular means 203 comprise lenticular elements 204 for refracting light emanating from the LC display 202. The lenticular elements 204 are located on the reverse side as seen through the lenticular means 203. The light source 201 illuminates the LC display 202 comprising pixels 205 arranged in a row and column matrix. The light from the light source 201 illuminates the LC display 202 and propagates through the lenticular elements. Preferably, the lenticular means comprises a lenticular screen.

Figure 3A:
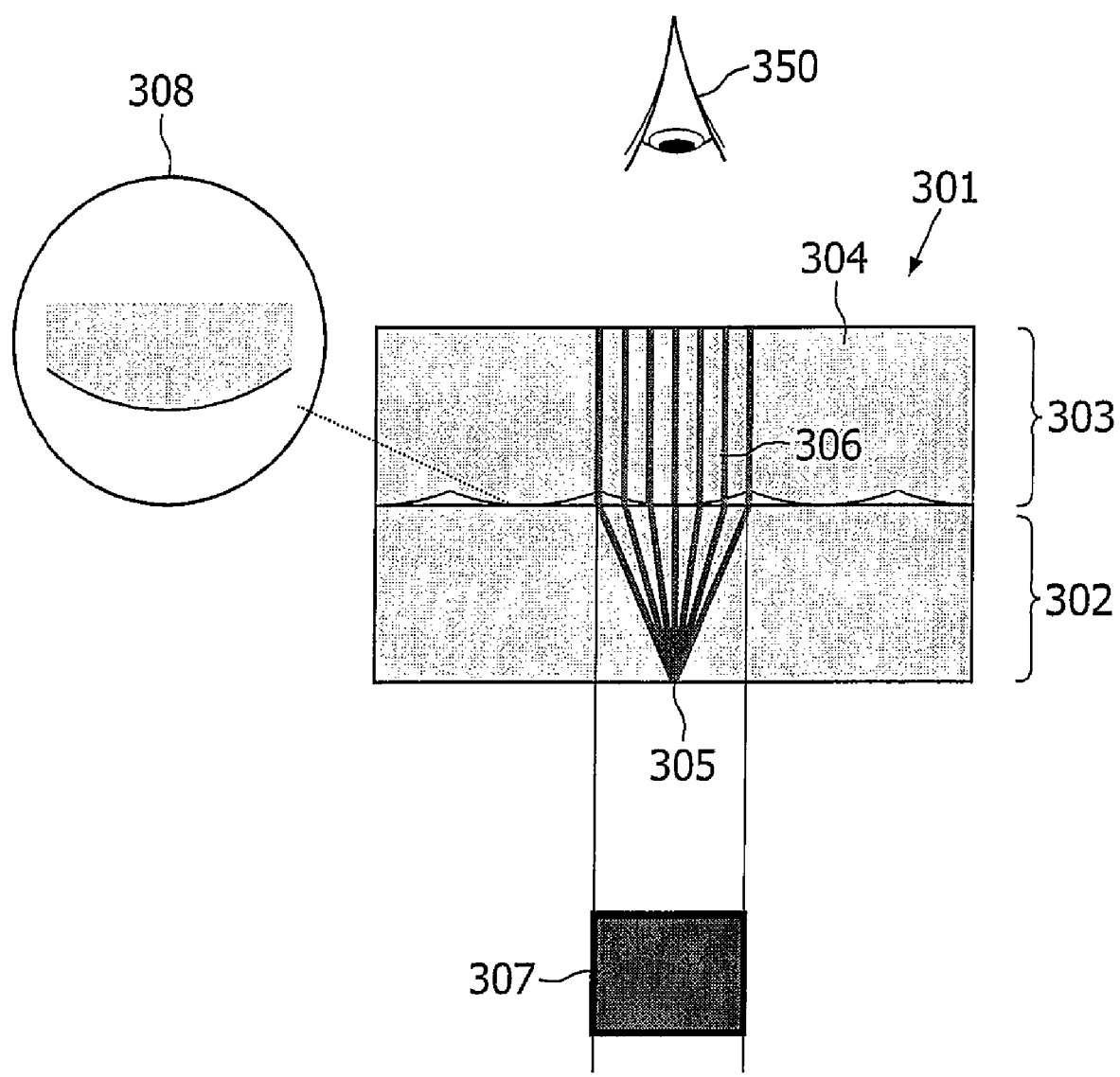
FIG. 3 shows schematically a cross-sectional close-up view of a lenticular structure of section a) a conventional lenticular layer and section b) a lenticular layer according to a first embodiment of the invention.
Figure 3B:
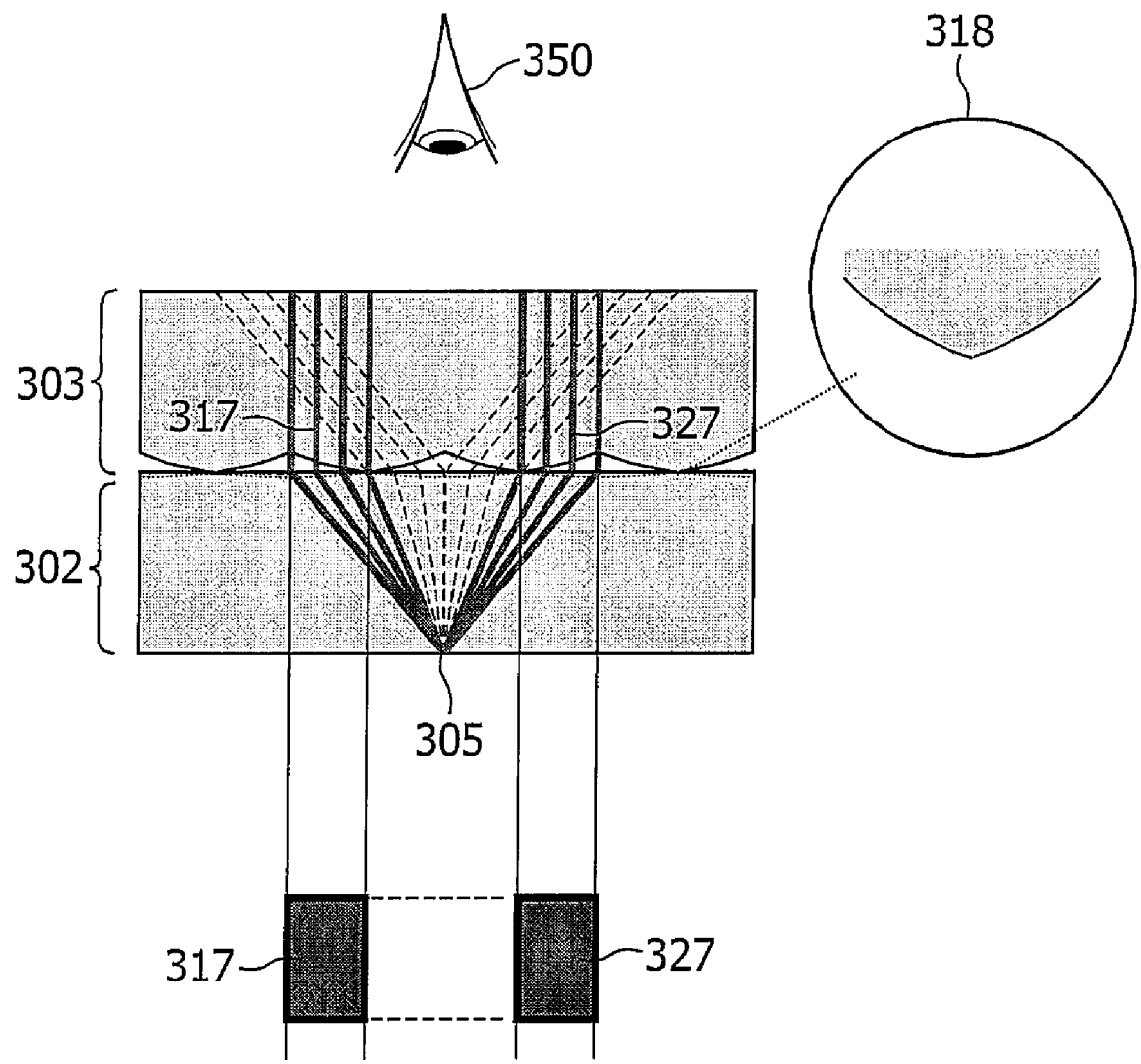
Figure 4A:
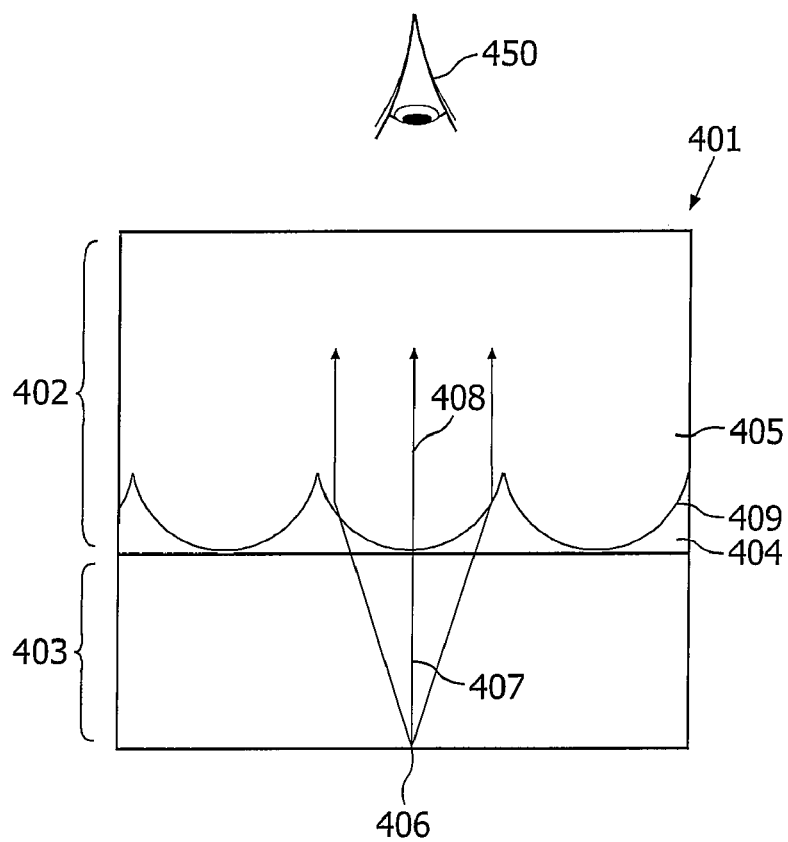
Figure 4B:
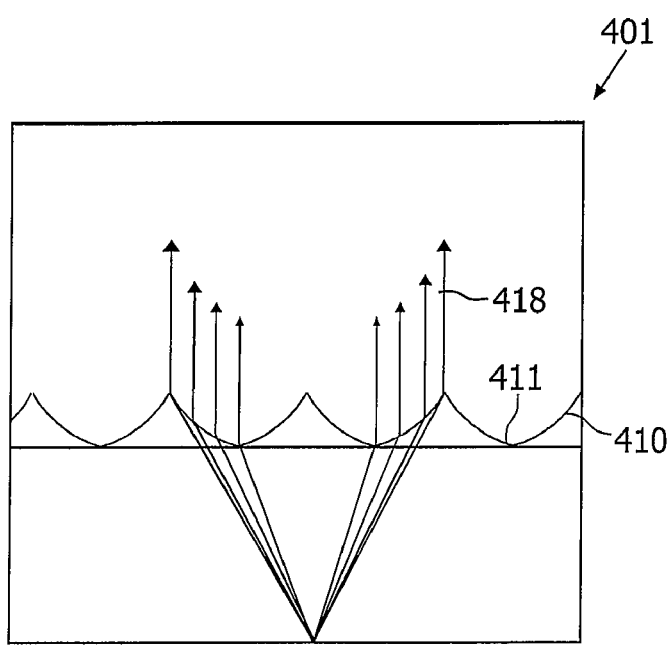
Figure 4C:
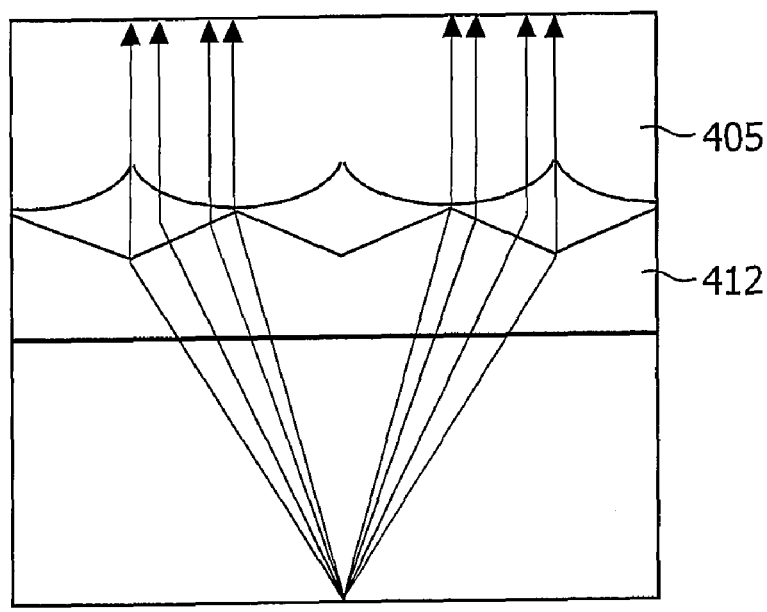
Figure 4D:
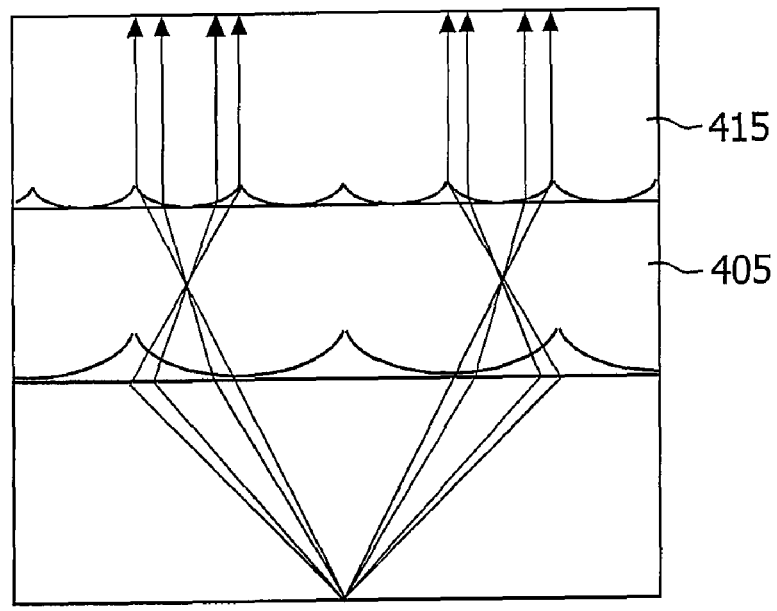
Figure 4E:
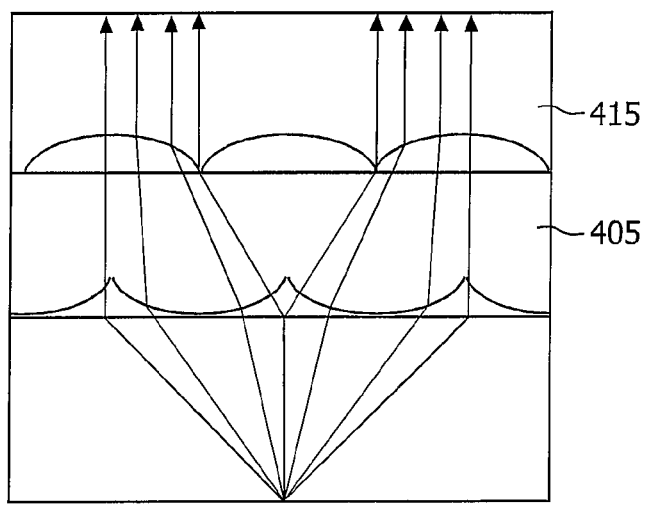

FIG. 3 is a schematic view of a cross section of a small area of a display device 301 such as the display devices 104 and 200 described above. In FIG. 3 two layers are shown, an intermediate layer 302 commonly comprising glass, and a refracting layer 303 comprising lenticular elements 304. In section a) a close up view 308 of the lenticular according to a conventional display device is shown. In section b) a close up view 318 of the lenticular according to one embodiment of the invention is shown. Light emitted from a light source (not shown) propagates through a layer of pixels (not shown) in which a pixel 305 is indicated. Light transmitted through the pixel 305 conically diverges in the intermediate layer 302 and is directed during the passage through the lenticular elements 304 in the refracting layer 303. An observer 350 then observes the light 306 emanating from the lenticular elements 304. In a conventional display device as depicted in section a) the light 306 is perceived by the observer 350 as a single image 307 of the pixel 305 from which the light emanates. In an image device depicted in section b) according to a first embodiment of the invention, two pencils of light 317 and 327 from the pixel 305 are directed by the refracting layer 303, splitting the image of the pixel in two parts 317 and 327 as viewed by the observer. The two resulting "satellite" images 317 and 327, being separated at a distance of 2.0 lens pitch apart, together constitute the original pixel 305.

FIG. 4 is a schematic view of a number of embodiments implementing pixel splitting. Various structures and combinations of lenticular and prism elements are shown. Each of the sections of FIG. 4 show a display device 401, a refractive layer 402, an intermediate layer 403, a cavity 404, a plurality of lenticular elements 405, an indicated pixel 406, a ray locus 407, refracted rays of light 408 and 418 and an observer 450. The cavities 404 usually comprise vacuum or air. Section a) of FIG. 4 is a geometry comprising conventional cylindrical lenticular elements 409. Section b) of FIG. 4 shows the geometry of a segmented lens 410, in which each lenticular element comprises a discontinuity 411 at the centre of its curvature. In section b) the curved surfaces are shown according to the preferred embodiment of having merged parts of cylindrical lenticular elements having a pitch equal to twice the inherent lens pitch. Sections c) to e) of FIG. 4 shows embodiments comprising multiple refracting layers. Section c) shows a combination of a prisms 412 and lenticular elements 405. The order of the lenticular layer and the prism layer may be reversed. Sections d) and e) shows combinations of a first 405 and a second 415 layer of cylindrical lenticular elements 405 stacked on each other. In section d) both the first 405 and the second 415 layers have the curvature facing towards the pixel layer. In section e) the first 405 and second 415 layers are facing opposite directions. Other combinations may be preferable, for instance comprising additional layers of prisms and/or lenticular elements.

Only a limited number of configurations are suited for pixel splitting. A fully exhaustive inventory of the slant angle versus pitch combinations has not yet been carried out. However, the 8 views, slant ⅙ configuration and the 4 views, slant ⅓ configuration are recognized as suitable for pixel splitting.

It depends on the details of the configuration whether or not pixel splitting can improve the perceived resolution.

FIG. 5 shows schematically the pixel splitting structure according to section a) a first 601 geometry and section b) a second 611 geometry. It is shown a lenticular element 602, an indicated native pixel 603 (behind lenticular), and images 604 and 614 and 605 and 615 respectively of native pixel 603. Furthermore, neighbouring sub pixels or colour elements are indicated with R, G and B.

FIG. 5 section a) schematically shows a pixel structure 601 of a 9 views, slant ⅙ geometry. Here, the "satellite" images of different pixels fall close together as indicated with 604 and 614. Hence, with this geometry the splitting does not result in any significantly finer pixel structure. This is due to the fact that the pitch of the "ordinary" 3D pixels is two times the lens pitch.

FIG. 5, section b) schematically shows a pixel structure of an 8 views, slant ⅙ geometry much better suited for splitting. The pitch of the ordinary 3D pixels is three times the lens pitch. As a result, the "satellite" images become evenly distributed as indicated by 606 and 616, resulting in a finer pixel structure.

The perceived pixel structure is improved. However, the actual addressable resolution is not improved, due to the fact that the pairs of "satellite" images cannot be addressed separately.

Hence, to summarize, it is disclosed a 3D display that uses one or more specially shaped lenticular elements that reduces the size of the smallest colour elements constituting an image. The invention reduces the visibility of the pixel structure and thereby the perceived graininess of the image without actually increasing the actual resolution. Embodiments for reducing the graininess by a factor of two have been disclosed.

Furthermore, the technique of pixel splitting may be a viable option to reduce the graininess of a 3D display. It is particularly interesting for television applications where it might eliminate the need for a fully switchable LC filled lens.

Pixel splitting can also be combined with liquid crystal (LC) filled switchable lenses, and may become interesting for mobile and monitor application as well.

The invention claimed is:

1. A display apparatus comprising a display device configured to display an image, said display device comprising a plurality of picture elements and lenticular means, said lenticular means comprising one or more refracting layers configured to direct light emanating from the plurality of picture elements in a plurality of laterally separated directions such that said image is divided in two or more substantially identical images.

2. The display apparatus according to claim 1, wherein said centers of the substantially identical images are being separated at least a distance of 0.5 times a width of a lenticular element in the lenticular means.

3. The display apparatus according to claim 1, wherein said centers of the substantially identical images are being separated at least a distance of 1.0 times a width of a lenticular element in the lenticular means.

4. The display apparatus according to claim 1, wherein said centers of the substantially identical images are being separated at least a distance of 1.5 times a width of a lenticular element in the lenticular means.

5. The display apparatus according to claim 1, wherein a first layer of the refracting layers comprises lenticular elements.

6. The display apparatus according to claim 5, wherein each said lenticular element comprises a discontinuity in curvature substantially at its center.

7. The display apparatus according to claim 1, wherein a second layer of the refracting layers comprises prism elements.

8. The display apparatus according to claim 5, wherein said lenticular elements are essentially cylindrical.

9. The display apparatus according to claim 1, wherein the plurality of picture elements are arranged in a first matrix having a first orientation and lenticular elements having a second orientation, said first and second orientation having an angle of rotation in relation to each other.

10. The display apparatus according to claim 9, wherein 8 simultaneous three dimensional views are displayed and the angle of rotation is $\operatorname{atan}(1/6)$.

11. The display apparatus according to claim 9, wherein 4 simultaneous three dimensional views are displayed and the angle of rotation is $\operatorname{atan}(1/3)$.

12. The display apparatus according to claim 1, wherein lenticular elements are liquid crystal filled switchable lenses.

* * * * *